United States Patent
Okimura

(10) Patent No.: US 10,343,480 B2
(45) Date of Patent: Jul. 9, 2019

(54) SUSPENSION SYSTEM

(71) Applicant: TOYOTA JIDOSHA KABUSHIKI KAISHA, Toyota-shi, Aichi-ken (JP)

(72) Inventor: Kohtaroh Okimura, Nissin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 92 days.

(21) Appl. No.: 15/809,111

(22) Filed: Nov. 10, 2017

(65) Prior Publication Data

US 2018/0229574 A1 Aug. 16, 2018

(30) Foreign Application Priority Data

Feb. 15, 2017 (JP) .................................. 2017-025932

(51) Int. Cl.
*B60G 17/08* (2006.01)
*B60G 15/14* (2006.01)
*B60G 17/052* (2006.01)
*B60G 17/015* (2006.01)
*B60G 17/04* (2006.01)

(52) U.S. Cl.
CPC ............ *B60G 17/08* (2013.01); *B60G 15/14* (2013.01); *B60G 17/0155* (2013.01); *B60G 17/0416* (2013.01); *B60G 17/0432* (2013.01); *B60G 17/0528* (2013.01); *B60G 2400/20* (2013.01); *B60G 2400/952* (2013.01); *B60G 2500/2014* (2013.01); *B60G 2500/22* (2013.01); *B60G 2500/30* (2013.01); *B60G 2800/162* (2013.01)

(58) Field of Classification Search
CPC ................ B60G 17/08; B60G 17/0432; B60G 17/0416; B60G 15/14; B60G 17/0155; B60G 17/0528; B60G 2400/952; B60G 2400/20; B60G 2800/162; B60G 2500/22; B60G 2500/2014; B60G 2500/30
See application file for complete search history.

(56) References Cited

U.S. PATENT DOCUMENTS 5,042,834 A * 8/1991 Yonekawa ............ B60G 17/016 280/5.508
5,188,390 A * 2/1993 Clark .................. B60G 17/0152 280/5.501
6,266,590 B1 * 7/2001 Kutscher ............ B60G 17/0155 280/124.157

(Continued)

FOREIGN PATENT DOCUMENTS

JP 09-156338 A 6/1997
JP 2008-168861 A 7/2008

*Primary Examiner* — Darlene P Condra
(74) *Attorney, Agent, or Firm* — Sughrue Mion, PLLC

(57) ABSTRACT

A valve control device is configured to execute a specific valve control when a valve switching condition at high pressure is satisfied. The specific valve control switches the spring constant change valves for front wheel to a blocking state and switches a spring constant change valves for rear wheel to a communication permission state. The valve switching condition at high pressure is satisfied when oil pressure of hydraulic oil of rear wheel side oil hydraulic cylinders, which is detected by rear wheel side oil pressure detection means, is more than or equal to a predetermined oil pressure threshold and the traveling state determination means determines that a vehicle is in a predetermined traveling state.

3 Claims, 9 Drawing Sheets

(56) References Cited

U.S. PATENT DOCUMENTS

| | | | | |
|---|---|---|---|---|
| 2006/0055129 A1* | 3/2006 | Amano | ............... | B60G 17/015 |
| | | | | 280/5.507 |
| 2008/0100017 A1* | 5/2008 | Bitter | .................. | B60G 17/005 |
| | | | | 280/124.16 |
| 2009/0062985 A1* | 3/2009 | Ohashi | .................. | B60G 17/04 |
| | | | | 701/37 |

\* cited by examiner

SUSPENSION SYSTEM

BACKGROUND OF THE INVENTION

1. Field of the Invention

The present invention relates to a suspension system capable of adjusting vehicle height using an oil hydraulic cylinder provided between a vehicle body and wheels.

2. Description of the Related Art

The suspension system disclosed in Japanese Unexamined Patent Application Publication No. 2008-168861 is provided with four oil hydraulic cylinders each of which corresponds to one of left and right front wheels and left and right wheels, respectively. Each of the oil hydraulic cylinders is connected to a hydraulic oil supply/discharge device via corresponding one of individual control passages.

An individual control valve is provided in each of the individual control passages. Each individual control valve opens and closes the corresponding one of the individual control passages.

When hydraulic oil is supplied to each of the oil hydraulic cylinders from the hydraulic oil supply/discharge device by controlling the individual control valves and the hydraulic oil supply/discharge device, vehicle height of a vehicle having the suspension system becomes higher. On the other hand, when the hydraulic oil of each oil hydraulic cylinder is discharged to the hydraulic oil supply/discharge device, the vehicle height of the vehicle becomes lower.

In addition, the suspension system is provided with four high pressure accumulators and four low pressure accumulators, each of which corresponds to each oil hydraulic cylinder. The spring constant of each high pressure accumulator is greater than that of each low pressure accumulator.

Each of the high pressure accumulators always communicates with the corresponding oil hydraulic cylinder via a passage for the hydraulic oil. On the other hand, each of the low pressure accumulators is connected to the corresponding oil hydraulic cylinder via a passage for the hydraulic oil. This passage has a spring constant change valve. When the spring constant change valve is opened, the hydraulic oil become movable between the corresponding oil hydraulic cylinder and the corresponding low pressure accumulator via the corresponding passage. In other words, the oil hydraulic cylinder and the corresponding low pressure accumulator communicates with each other via the corresponding passage. On the other hand, when the spring constant change valve is closed, the hydraulic oil becomes immovable between the corresponding oil hydraulic cylinder and the corresponding low pressure accumulator. In other words, the oil hydraulic cylinder and the corresponding low pressure accumulator do not communicate with each other.

When the oil hydraulic cylinder and the corresponding low pressure accumulator communicate with each other, wheel rate of the wheel corresponding to this oil hydraulic cylinder becomes smaller. On the other hand, when the oil hydraulic cylinder and the corresponding low pressure accumulator do not communicate with each other, the wheel rate of the wheel corresponding to this oil hydraulic cylinder becomes larger. That is, when the spring constant change valves are switched between an opened state and a closed state, the wheel rate of each wheel changes.

In this suspension system, when the vehicle normally travels, each spring constant change valve is opened to set the wheel rate of each wheel to small value. On the other hand, when the vehicle turns or travels with rapid acceleration/deceleration, each spring constant change valve is closed to set the wheel rate of each wheel to large value.

As is well known, wheel rate is a spring constant at wheel position. Wheel rate represents a ratio between an amount of change in a ground contact load of a wheel and an amount of change in the vertical distance between the wheel center of the wheel and the vehicle body (wheel travel). That is, wheel rate represents an amount of change in a ground contact load of the wheel that is required to produce the unit wheel travel.

SUMMARY OF THE INVENTION

Typically, the suspension system of the vehicle is configured so that the front roll stiffness (i.e., the roll stiffness on the front wheels side) is somewhat larger than the rear roll stiffness (i.e., the roll stiffness on the rear wheels side) in an initial state. In other words, the front roll stiffness distribution (i.e., the roll stiffness distribution on the front wheels side) is somewhat larger than 50%. Therefore, when no load other than the load of the vehicle body is applied to the vehicle and the front wheel rate (i.e., the wheel rate of the front wheels) and the rear wheel rate (i.e., the wheel rate of the rear wheels) are the same as each other, the steer characteristic of the vehicle typically has tendency to slightly understeer.

Typically, a luggage room is provided at the rear portion of the vehicle.

When the total weight of the luggage loaded in the luggage room of the vehicle is large value, the oil pressure of each of the oil hydraulic cylinders corresponding to the rear wheels becomes large value.

In this case, when all the spring constant change valves are closed to set the front wheel rate and the rear wheel rate to large values, the rear wheel rate may become excessively large. Then, for example, the rear roll stiffness becomes larger than the front roll stiffness (that is, the rear roll stiffness distribution, or the roll stiffness distribution on the rear wheels side becomes larger than 50%), and thus the steer characteristic of the vehicle may have tendency to oversteer when the vehicle turns.

The present invention has been made to cope with the above problems, and has an object to provide a suspension system that can prevent behavior of a vehicle from becoming unstable when oil pressure of an oil hydraulic cylinder corresponding to a rear wheel is large value and the vehicle is in a predetermined traveling state.

In order to achieve the object, an assembled structure for tire wheel, brake rotor, and hub comprises:

two front wheel side oil hydraulic cylinders (20FL, 20FR) provided between left and right front wheels (WFL, WFR) of a vehicle and a vehicle body respectively, the each front wheel side oil hydraulic cylinder extending and contracting according to vertical distance change between the each front wheel and the vehicle body, the each front wheel side oil hydraulic cylinder moving the vehicle body upwards with respect to the front wheels as oil pressure of hydraulic oil filled in the each front wheel side oil hydraulic cylinder increases;

two rear wheel side oil hydraulic cylinders (20RL, 20RR) provided between left and right rear wheels (WRL, WRR) and the vehicle body respectively, the each rear wheel side oil hydraulic cylinder extending and contracting according to vertical distance change between the each rear wheel and the vehicle body, the each rear wheel side oil hydraulic cylinder moving the vehicle body upwards with respect to the rear wheels as oil pressure of hydraulic oil filled in the each rear wheel side oil hydraulic cylinder increases;

hydraulic oil supply means (70) capable of supplying the hydraulic oil to the front wheel side oil hydraulic cylinders and the rear wheel side oil hydraulic cylinders while adjusting the oil pressure;

four first gas springs (31) each of which is provided so as to correspond to the each front wheel side oil hydraulic cylinder and the each rear wheel side oil hydraulic cylinder respectively and has a first oil chamber (31*c*) and a first gas chamber (31*d*), wherein each the first oil chamber communicates with the each front wheel side oil hydraulic cylinder or the each rear wheel side oil hydraulic cylinder and is filled with the hydraulic oil, the first gas chamber filled with a gas having elasticity;

four second gas springs (32) each of which is provided so as to correspond to the each front wheel side oil hydraulic cylinder and the each rear wheel side oil hydraulic cylinder respectively and has a second oil chamber (32*c*) and a second gas chamber (32*d*), each second gas spring being independent form the first gas springs, wherein each the second oil chamber can communicate with the each front wheel side oil hydraulic cylinder or the each rear wheel side oil hydraulic cylinder and is filled with the hydraulic oil, the second gas chamber filled with a gas having elasticity;

two spring constant change valves for front wheel (62FL, 62FR) each of which is provided so as to correspond to the each front wheel side oil hydraulic cylinder, the each spring constant change valve for front wheel capable of being switched between a communication permission state and a blocking state, wherein the communication permission state is a state where the each spring constant change valve for front wheel permits communication of the hydraulic oil between the front wheel side oil hydraulic cylinder and the corresponding second oil chamber so that the second gas spring and the first gas spring, both of which correspond to the same front wheel side oil hydraulic cylinder, are connected with each other in a serial connection state, wherein the blocking state is a state where the communication is blocked;

two spring constant change valves for rear wheel (62RL, 62RR) each of which is provided so as to correspond to the each rear wheel side oil hydraulic cylinder, the each spring constant change valve for rear wheel capable of being switched between a communication permission state and a blocking state, wherein the communication permission state is a state where the each spring constant change valve for rear wheel permits communication of the hydraulic oil between the rear wheel side oil hydraulic cylinder and the corresponding second oil chamber so that the second gas spring and the first gas spring, both of which correspond to the same rear wheel side oil hydraulic cylinder, are connected with each other in a serial connection state, wherein the blocking state is a state where the communication is blocked;

rear wheel side oil pressure detection means (90) for detecting the oil pressure of the hydraulic oil of the rear wheel side oil hydraulic cylinders;

traveling state determination means (100) for determining whether or not the vehicle is in a predetermined traveling state; and a valve control device (100) switching the spring constant change valves for front wheel between the communication permission state and the blocking state and switching the spring constant change valves for rear wheel between the communication permission state and the blocking state.

The valve control device is configured to:

switch the spring constant change valves for front wheel and the spring constant change valves for rear wheel to the blocking state when the oil pressure of the hydraulic oil of the rear wheel side oil hydraulic cylinders, which is detected by the rear wheel side oil pressure detection means, is less than a predetermined oil pressure threshold (Thop) and the traveling state determination means determines that the vehicle is in the predetermined traveling state; and execute a specific valve control when a valve switching condition at high pressure is satisfied, wherein the specific valve control switches the spring constant change valves for front wheel to the blocking state and switches the spring constant change valves for rear wheel to the communication permission state, wherein the valve switching condition at high pressure is satisfied when the oil pressure of the hydraulic oil of the rear wheel side oil hydraulic cylinders, which is detected by the rear wheel side oil pressure detection means, is more than or equal to the predetermined oil pressure threshold and the traveling state determination means determines that the vehicle is in the predetermined traveling state.

For example, when the vehicle turns, the vehicle suddenly starts, or sudden braking is executed during high-speed driving, the traveling state determination means determines that the vehicle is in the predetermined traveling state.

For example, when a luggage having a large weight is loaded in a luggage room provided at a rear portion of the vehicle having the suspension system of the present invention, oil pressure in each of the rear wheel side oil hydraulic cylinders may become larger than or equal to the predetermined oil pressure threshold.

When each of the spring constant change valves is switched to the blocking state under the state where the vehicle turns and the oil pressure of each rear wheel side oil hydraulic cylinder is more or equal to the oil pressure threshold, the rear wheel rate may become larger than the front wheel rate. Then, the rear roll stiffness becomes larger than the front roll stiffness (i.e., the rear roll stiffness distribution is larger than 50%). As a result, the steer characteristic of the vehicle may have tendency to oversteer.

However, according to the present invention, when the oil pressure of the hydraulic oil in each of the rear wheel side oil hydraulic cylinders is larger than or equal to the predetermined oil pressure threshold and the vehicle is in the predetermined traveling state, the valve control device makes each spring constant change valve for front wheel in the blocking state while making each spring constant change valve for rear wheel in the communication permission state. In other words, when the valve switching condition at high pressure is satisfied, the valve control device executes the specific valve control to make the front wheel rate become large value and make the rear wheel rate become small value. Thus, the rear roll stiffness is hard to become larger than the front roll stiffness.

Thus, when, for example, the vehicle turns, the risk that the steer characteristic of the vehicle has tendency to oversteer is small.

In one aspect of the present invention, the suspension system further comprises front wheel side oil pressure detection means (90) for detecting the oil pressure of the hydraulic oil of the front wheel side oil hydraulic cylinders.

In this aspect, the valve control device is configured to be prohibited from executing the specific valve control when the valve switching condition at high pressure is satisfied under a state where the hydraulic oil supply means supplies the hydraulic oil to the front wheel side oil hydraulic cylinders and the rear wheel side oil hydraulic cylinders so that the vehicle body moves upward with respect to the front wheels and the rear wheels.

In this aspect, the oil pressure of the hydraulic oil of the rear wheel side oil hydraulic cylinders when a rear wheel side oil pressure ratio is equal to a predetermined ratio threshold is equal to the oil pressure threshold, the rear wheel side oil pressure ratio is a value obtained by dividing the oil pressure of the hydraulic oil of the rear wheel side oil hydraulic cylinders, which is detected by the rear wheel side oil pressure detection means, by the oil pressure of the hydraulic oil of the front wheel side oil hydraulic cylinders, which is detected by the front wheel side oil pressure detection means.

The front roll stiffness distribution (i.e., the roll stiffness distribution on the front wheels side) and the rear roll stiffness distribution (i.e., the roll stiffness distribution on the rear wheels side) is actually have a certain correlation with the ratio between the oil pressure of the hydraulic oil in the front wheel side oil hydraulic cylinders and the oil pressure of the hydraulic oil in the rear wheel side oil hydraulic cylinders. That is, when the rear wheel side oil pressure ratio, which is the value obtained by dividing the oil pressure of the rear wheel side oil hydraulic cylinder by the oil pressure of the front wheel side oil hydraulic cylinder, is larger than or equal to the predetermined ratio threshold, the rear roll stiffness may become excessively larger than the front roll stiffness.

The oil pressure threshold of this aspect is set as the oil pressure of the rear wheel side oil hydraulic cylinder when the rear wheel side oil pressure ratio is equal to the ratio threshold. That is, the oil pressure threshold is a variable value that varies depending on the oil pressures of the front wheel side oil hydraulic cylinders and the rear wheel side oil hydraulic cylinders.

In this way, the oil pressure threshold is the value determined based on a relationship between the front and rear roll stiffnesses and the oil pressures of the front wheel side oil hydraulic cylinders and the rear wheel side oil hydraulic cylinders.

Therefore, according to this aspect, for example, the possibility that the behavior of the vehicle becomes unstable when the vehicle is in the predetermined traveling state becomes smaller.

Furthermore, when, for example, luggage having large weight is loaded in a luggage room provided at the rear portion of the vehicle and multiple (enormous) occupants are located inside the vehicle, the oil pressure of the hydraulic oil in the front wheel side oil hydraulic cylinders becomes (greatly) larger than when only driver is located inside the vehicle. Therefore, in this case, the oil pressure threshold becomes a value larger than when, for example, only the driver is located inside the vehicle.

Therefore, when, for example, the luggage having large weight is loaded in the luggage room provided at the rear portion of the vehicle and multiple (enormous) occupants are located inside the vehicle, the oil pressure of the hydraulic oil in the rear wheel side oil hydraulic cylinders is harder to be larger than or equal to the oil pressure threshold compared with the case where the luggage having large weight is loaded in the luggage room and only driver is located inside the vehicle. That is, in this case, the valve switching condition at high pressure is hard to be satisfied.

In this aspect, when the vehicle body moves upward with respect to the front wheels and the rear wheels, the specific valve control is not executed when the valve switching condition at high pressure is satisfied.

However, in this aspect, the valve switching condition at high pressure is hard to be satisfied. That is, when the vehicle height of the vehicle is becoming higher, a state where the specific valve control should be executed is hard to be realized.

Therefore, even though the specific valve control is not executed when the vehicle body moves upward with respect to the front wheels and the rear wheels, the risk that the behavior of the vehicle in the predetermined traveling state becomes unstable when the vehicle height of the vehicle, which is turning, is becoming higher is small.

In one aspect of the present invention, the valve control device executes the specific valve control and the hydraulic oil supply means is prohibited from supplying the hydraulic oil to the front wheel side oil hydraulic cylinders and the rear wheel side oil hydraulic cylinders when the valve switching condition at high pressure is satisfied under a state where the hydraulic oil supply means supplies the hydraulic oil to the front wheel side oil hydraulic cylinders and the rear wheel side oil hydraulic cylinders so that the vehicle body moves upward with respect to the front wheels and the rear wheels.

According to the one aspect of the present invention, when the valve switching condition at high pressure is satisfied under the state where the vehicle body moves upward with respect to the front wheels and the rear wheels, control which makes the vehicle height become higher is prohibited, and the specific valve control is executed.

Thus, for example, the risk that the steer characteristic of the vehicle has tendency to oversteer can be reduced when the control which makes the vehicle height become higher is executed and the vehicle turns.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Hereinafter, an embodiment of the present invention will be described with reference to the drawings.

In the following description, the letter FL appended at the end of each reference (symbol) indicates that the member represented by this reference (symbol) is a front wheel on the left side or a member corresponding to the front wheel on the left side. Similarly, the letters FR appended at the end of each reference (symbol) indicates that the member represented by this reference (symbol) is a front wheel on the right side or a member corresponding to the front wheel on the right side. Similarly, the letter RL appended at the end of each reference (symbol) indicates that the member represented by this reference (symbol) is a rear wheel on the left side or a member corresponding to the rear wheel on the left side. Similarly, the letter RR appended at the end of each reference (symbol) indicates that the member represented by this reference (symbol) is a rear wheel on the right side or a member corresponding to the rear wheel on the right side.

However, when the wheel and/or the member corresponding to this wheel do not need to be identified, each of letters FL, FR, RL, RR may be omitted from each reference (symbol) indicating this wheel and/or the member corresponding to this wheel. For example, all the wheels may be represented by letter "W".

Figure 1:
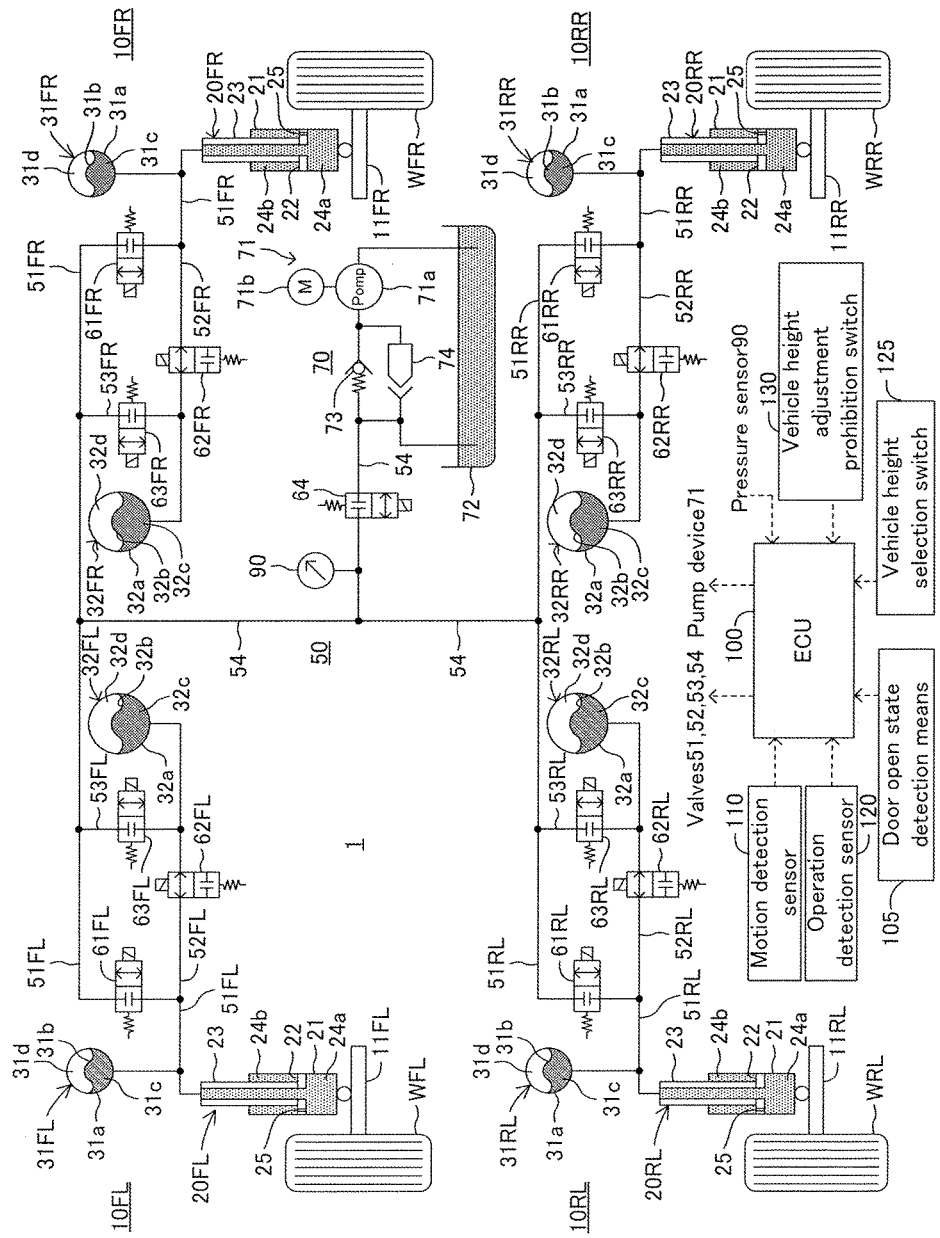
FIG. 1 is an overall configuration diagram of a suspension system according to an embodiment of the present invention.

The vehicle of this embodiment is provided with a suspension system 1 shown in FIG. 1.

A luggage room (not shown) is provided at the rear portion of the vehicle body of this vehicle.

Furthermore, the vehicle is provided with a plurality of side doors for opening and closing side openings of the vehicle body and one luggage door for opening and closing and the luggage room.

In addition, the vehicle is provided with a door open state detection means 105 which detects an opened state of each side door and an opened state of the luggage door.

This suspension system 1 is provided with four suspension devices 10FL, 10FR, 10RL, 10RR, an oil hydraulic control circuit 50, a hydraulic oil supply/discharge device 70 and an electronic control unit 100 (hereinafter referred to as an ECU 100).

A front wheel WFL on the left side and the vehicle body are connected by the suspension device 10FL. A front wheel WFR on the right side and the vehicle body are connected by the suspension device 10FR. A rear wheel WRL on the left side and the vehicle body are connected by the suspension device 10RL. A rear wheel WRR on the right side and the vehicle body are connected by the suspension device 10RR.

A hydraulic oil supply/discharge device 70 is capable of supplying hydraulic oil to each of the suspension devices 10FL, 10FR, 10RL, 10RR and is capable of making each of the suspension devices 10FL, 10FR, 10RL, 10RR discharge the hydraulic oil.

An oil hydraulic control circuit 50 is provided between each of the suspension devices 10FL, 10FR, 10RL, 10RR and the hydraulic oil supply/discharge device 70.

The ECU 100 controls the operation of the oil hydraulic control circuit 50 and the operation of the hydraulic oil supply/discharge device 70.

Each of the suspension devices 10 comprises a wheel support member 11 (e.g., a lower arm) supporting corresponding one of the wheels W, and four oil hydraulic cylinders 20 each of which is provided between each wheel support member 11 and the vehicle body. A suspension spring (not shown) is provided between each wheel support member 11 and the vehicle body.

The suspension system 1 of the present embodiment is configured so that the front roll stiffness (i.e., the roll stiffness on the front wheels WFL, WFR side) is slightly larger than the rear roll stiffness (i.e., the roll stiffness on the rear wheels WRL, WRR side) in an initial state thereof. In other words, the suspension system 1 is configured so that the front roll stiffness distribution (i.e., the roll stiffness distribution on the front wheels WFL, WFR side) is slightly greater than 50% in the initial state. That is, the suspension system 1 is configured so that the steer characteristic of the vehicle has tendency to slightly understeer when no load other than the load of the vehicle is applied to the vehicle and the front wheel rate (i.e., the wheel rate of the front wheels WFL, WFR) and the rear wheel rate (i.e., the wheel rate of the rear wheels WRL, WRR) are the same as each other.

Each of the oil hydraulic cylinders 20 functions as a shock absorber.

The structures of the oil hydraulic cylinders 20 are the same as each other. Each of the oil hydraulic cylinders 20 comprises a cylinder 21, a piston 22 provided inside the cylinder 21, and a piston rod 23 whose lower end is fixed to the piston 22. The axis of each of the oil hydraulic cylinders 20 (the cylinders 21) is substantially parallel to the vertical direction.

As is well known, the piston 22 is slidable in the axial direction of the cylinder 21 relative to the inner peripheral surface of the cylinder 21. The piston rod 23 extends in the axial direction of the cylinder 21. The lower end of the piston rod 23 is always positioned inside the cylinder 21 and the upper end of the piston rod 23 is always positioned outside the cylinder 21. The lower end of the cylinder 21 is connected to the corresponding wheel support member 11, and the upper end of the piston rod 23 is connected to the vehicle body. Therefore, each of the oil hydraulic cylinders 20 extends and contracts according to the vertical distance change between the corresponding wheel support member 11 and the vehicle body.

The hydraulic oil is filled in each cylinder 21. Each of the cylinders 21 is divided into two oil chambers 24a, 24b by the corresponding piston 22. A communicating passage 25 is formed in each piston 22 as a through hole. The oil chamber 24a and the corresponding oil chamber 24b are in communication with each other via the corresponding communicating passage 25. When the piston 22 moves relative to the cylinder 21 in the vertical direction, the hydraulic oil in the cylinder 21 moves between the oil chamber 24a and the oil chamber 24b via the communicating passage 25. When the hydraulic oil passes through the communicating passage 25, each oil hydraulic cylinder 20 generates a damping force whose magnitude is determined depending on the relative moving speed of the piston 22 to the cylinder 21.

In the following description, the oil hydraulic cylinders 20 corresponding to the front wheels WFL, WFR may be referred to as the front wheel side oil hydraulic cylinders 20FL, 20FR in some cases.

Similarly, the oil hydraulic cylinders 20 corresponding to the rear wheels WRL, WRR may be referred to as the rear wheel side oil hydraulic cylinders 20RL, 20RR.

The oil hydraulic control circuit 50 is provided with individual supply/discharge passages 51, individual rate switching passages 52, individual bypass passages 53, and a common supply/discharge passage 54. The individual supply/discharge passages 51, the individual rate switching passages 52, the individual bypass passages 53, and the common supply/discharge passage 54 are the passages for the hydraulic oil. Each of the individual supply/discharge passages 51, each of the individual rate switching passages 52, and each of the individual bypass passages 53 correspond to each of the wheels W. That is, the oil hydraulic control circuit 50 includes four of the individual supply/discharge passages 51FL, 51FR, 51RL, 51RR, four of the individual rate switching passages 52FL, 52FR, 52RL, 52RR, and four of the individual bypass passages 53FR, 53FR, 53RL, 53RR. Furthermore, the oil hydraulic control circuit 50 includes one common supply/discharge passage 54.

The oil chamber 24a of each oil hydraulic cylinder 20 is connected to the corresponding individual supply/discharge passage 51.

Each of the oil hydraulic cylinders 20 raises the piston rod 23 using the pressure (i.e., the oil pressure, or hydraulic pressure) of the hydraulic oil supplied from the corresponding individual supply/discharge passage 51. Then, the vehicle body is raised relative to the wheel support member 11 by the piston rod 23 which corresponds to this wheel support member 11. As the oil pressure of the hydraulic oil in each oil hydraulic cylinder 20 becomes higher, the force generated by each oil hydraulic cylinder 20 becomes larger and thus the vehicle height of the vehicle becomes higher. On the other hand, when the oil pressure of each oil hydraulic cylinder 20 decreases, the piston rod 23 contracts (falls) to make the vehicle height become lower.

A main accumulator 31 and a leveling valves 61 are connected to each individual supply/discharge passage 51 in that order from the oil hydraulic cylinder 20 side.

The main accumulator 31 is provided with a housing 31a and a partition member 31b partitioning the inside of the housing 31a into two capacity variable rooms. The individual supply/discharge passage 51 is connected to an oil chamber 31c which is one of the two capacity variable rooms partitioned by the partition member 31b. That is, the oil chamber 31c of the main accumulator 31 is always in communication with the oil chamber 24a of the oil hydraulic cylinder 20. A gas chamber 31d, which is the other of the capacity variable rooms, is filled with gas having elasticity (for example, nitrogen gas). As is well known, the main accumulator 31 is an oil hydraulic gas spring which generates elastic force whose magnitude is determined depending on the oil pressure of the oil hydraulic cylinder 20 (i.e., the protrusion amount of the piston rod 23 from the cylinder 21). When the volume of the oil chamber 31c of the main accumulator 31 increases due to increase in the oil pressure of the oil hydraulic cylinder 20, the volume of the gas chamber 31d decreases and the spring constant of the main accumulator 31 increases. On the other hand, the volume of the oil chamber 31c of the main accumulator 31 decreases due to decrease in the oil pressure of the oil hydraulic cylinder 20, the volume of the gas chamber 31d increases and the spring constant of the main accumulator 31 decreases.

Each of the leveling valves 61 is a normally closed type electromagnetic on-off valve that opens and closes the corresponding individual supply/discharge passage 51.

The individual rate switching passage 52 is connected to each individual supply/discharge passage 51. The connection position of each individual supply/discharge passage 51 with the corresponding individual rate switching passage 52 is positioned between the leveling valve 61 and the oil hydraulic cylinder 20. A spring constant change valve 62 and a sub accumulator 32 are connected to each individual rate switching passage 52 in that order from the connection position with the individual supply/discharge passage 51.

The sub accumulator 32 is provided with a housing 32a and a partition member 32b partitioning the inside of the housing 32a into two capacity variable rooms. The individual rate switching passage 52 is connected to the oil chamber 32c which is one of the two capacity variable rooms partitioned by the partition member 32b. A gas chamber 32d, which is the other of the capacity variable rooms, is filled with gas having elasticity (for example, nitrogen gas). The sub accumulator 32 is an oil hydraulic gas spring similarly to the main accumulator 31.

In the present embodiment, the spring constant of the sub accumulator 32 is smaller than the spring constant of the main accumulator 31. However, the main accumulator 31 and the sub accumulator 32 may be configured so that the spring constant of the sub accumulator 32 is larger than the spring constant of the main accumulator 31. Alternatively, the main accumulator 31 and the sub accumulator 32 may be configured so that the spring constant of the main accumulator 31 and the spring constant of the sub accumulator 32 are the same as each other.

The types of the main accumulator 31 and the sub accumulator 32 are not limited. Each of the main accumulator 31 and the sub accumulator 32 may be, for example, a bellows type, a bladder type, or a piston type.

The main accumulator 31 of this embodiment is a metal bellows type accumulator excellent in anti-gas permeability at high compression pressure. The sub accumulator 32 of the present embodiment is a resin film-containing bladder type accumulator which has a relatively large capacity and is excellent in anti-gas permeability.

Each of the spring constant change valves 62 is a normally opened type electromagnetic on-off valve.

When the spring constant change valve 62 is opened, the oil hydraulic cylinder 20 and the corresponding sub accumulator 32 communicate with each other. When the spring constant change valve 62 is closed, the communication between the oil hydraulic cylinder 20 and the corresponding sub accumulator 32 is blocked.

Each of four individual supply/discharge passage 51 side ends of the common supply/discharge passage 54 are connected to each individual supply/discharge passage 51, respectively. Meanwhile, the remaining end (one end) of the common supply/discharge passage 54 is connected to the hydraulic oil supply/discharge device 70. The common supply/discharge passage 54 supplies the hydraulic oil discharged from the hydraulic oil supply/discharge device 70 to each individual supply/discharge passage 51 and returns the hydraulic oil discharged from each individual supply/discharge passage 51 back to the hydraulic oil supply/discharge device 70.

A main valve 64, which is a normally closed type electromagnetic on-off valve, is provided in the common supply/discharge passage 54. When the main valve 64 is opened, each individual supply/discharge passage 51 and the hydraulic oil supply/discharge device 70 communicate with each other via the common supply/discharge passage 54. When the main valve 64 is closed, the communication between each individual supply/discharge passage 51 and the hydraulic oil supply/discharge device 70 is blocked.

The oil hydraulic control circuit 50 is provided with four of the individual bypass passages 53FL, 53FR, 53RL, 53RR. A bypass valve 63 is provided in each individual bypass passage 53. Each of the bypass valves 63 is a normally closed type electromagnetic on-off valve.

When the bypass valves 63 is opened, the sub accumulator 32 communicates with the common supply/discharge passage 54 via the bypass valve 63 regardless of the states of the leveling valve 61 and the spring constant change valve 62. Thus, when the leveling valve 61 and the spring constant change valve 62 are in the closed state and the bypass valve 63 is in the opened state, each of the individual bypass passages 53 allows the hydraulic oil supplied to each individual supply/discharge passage 51 from the common supply/discharge passage 54 to flow to the corresponding sub accumulator 32 while bypassing the leveling valve 61 and the spring constant change valve 62.

The hydraulic oil supply/discharge device 70 is provided with a pump device 71 serving as a high pressure source and a reservoir tank 72 serving as a low pressure source.

The pump device 71 includes a pump 71a and a pump motor 71b for driving the pump 71a. The pump device 71 pumps up the hydraulic oil in the reservoir tank 72 and supplies it to the common supply/discharge passage 54.

The hydraulic oil supply/discharge device 70 is provided with a check valve 73 and a return valve 74. The check valve 73 and the return valve 74 are provided in the passage for hydraulic oil of the hydraulic oil supply/discharge device 70 in a parallel state.

The return valve 74 selectively allows the supply of the hydraulic oil from the pump device 71 to the main valve 64 and the discharge of the hydraulic oil from the main valve 64 to the reservoir tank 72.

The return valve 74 allows the hydraulic oil to flow through the passage between the main valve 64 and the reservoir tank 72 at normal times (i.e., when the pump device 71 is not activated). That is, at this time, the return valve 74 allows the hydraulic oil to be discharged from the main valve 64 to the reservoir tank 72.

On the other hand, when the pump device 71 is driven, the return valve 74 is closed by the differential pressure between the discharge pressure of the pump device 71 and the oil pressure of the common supply/discharge passage 54. Therefore, the hydraulic oil fails to flow through the passage between the main valve 64 and reservoir tank 72. Then, since the check valve 73 is opened, the hydraulic oil discharged from the pump device 71 flows to the main valve 64.

Furthermore, a pressure sensor 90, which detects the oil pressure of the hydraulic oil flowing downstream of the main valve 64 (i.e., the oil pressure of the hydraulic oil flowing on the oil hydraulic cylinders 20 side with respect to the main valve 64), is provided in the common supply/discharge passage 54. The pressure sensor 90 is provided in the common supply/discharge passage 54 so that the pressure sensor 90 is located downstream of the main valve 64, is located upstream of the four bypass valves 63 (is located on the main valve 64 side with respect to the four bypass valves 63), and is located upstream of the leveling valve 61.

When one leveling valve 61 is opened and the bypass valve 63 corresponding to this leveling valve 61 is closed, the pressure sensor 90 always detects the oil pressure of the oil hydraulic cylinder 20 corresponding to this leveling valve 61. On the other hand, when one bypass valve 63 is opened and the leveling valve 61 corresponding to this bypass valve 63 is closed, the pressure sensor 90 always detects the oil pressure of the sub accumulator 32 corresponding to this bypass valve 63. Further, the pressure sensor 90 repeatedly transmits the detection result to the ECU 100 at every predetermined time.

The ECU 100 is an abbreviation of electric control unit. The ECU 100 is provided with a microcomputer including a CPU and a driving circuit as main components. The microcomputer has a plurality of memories (for example, a ROM, a RAM, a backup RAM), an interface and the like which are connected to each other by a bus. Data, which includes a program executed by the CPU, a look-up table (a map), and constants, are stored in the ROM in advance. The RAM temporarily holds data according to the instruction from the CPU. The backup RAM holds data not only when an ignition switch of the vehicle is at the ON position but also when it is at the OFF position. The interface includes an AD converter. The CPU realizes various functions to be described later by executing a program stored in the memory (the ROM). The driving circuit includes, for example, a motor driving circuit and a solenoid valve driving circuit.

The leveling valves 61, the spring constant change valves 62, the bypass valves 63, the main valve 64, the pump device 71 (the pump motor 71b), and the door open state detection means 105 are connected to the ECU 100.

Furthermore, a motion detection sensor 110 for detecting the motion state of the vehicle and an operation detection sensor 120 for detecting the operation by the driver are connected to the ECU 100.

The motion detection sensor 110 includes, for example, a vehicle speed sensor for detecting the vehicle speed, a vehicle height sensor for detecting the vehicle height, a vertical acceleration sensor for detecting the vertical acceleration of the vehicle body, a yaw rate sensor for detecting the yaw rate of the vehicle body, and a horizontal acceleration sensor for detecting accelerations of the vehicle body in the forward and rearward direction and the lateral direction. The vehicle height sensor detects four distances between each of the wheel support members 11 supporting the corresponding wheel W and four specific parts of the vehicle body as the vehicle heights. That is, the vehicle height sensor detects the vehicle heights at four points of the vehicle, each of which corresponds to each wheel. In the following, each of these four points may be referred to as vehicle height measured portion.

The operation detection sensor 120 includes, for example, a stroke sensor for detecting depression stroke of a brake pedal, a steering angle sensor for detecting steering angle of a steering wheel, and a transfer sensor for detecting range state of a transfer.

Furthermore, the ECU 100 is connected to a vehicle height selection switch 125 and a vehicle height adjustment prohibition switch 130.

The vehicle height selection switch 125 is operated by an occupant of the vehicle. The occupant can select a target vehicle height from among a normal vehicle height, a low vehicle height, and a high vehicle height by operating the vehicle height selection switch 125. The normal vehicle height is the vehicle height between the high vehicle height and the low vehicle height.

The vehicle height adjustment prohibition switch 130 is operated by the occupant of the vehicle. When the vehicle height adjustment prohibition switch 130 is moved from a non-operation position (an initial position) to an operation position by the occupant, the ECU 100 is prohibited from executing vehicle height control.

The ECU 100 executes the vehicle height control and wheel rate switching control based on the detection signals detected by the motion detection sensor 110 and the operation detection sensor 120.

First, the vehicle height control will be explained.

In the present embodiment, two types of the vehicle height control are executed. That is, the vehicle height control of the present embodiment includes a manual vehicle height control and an automatic vehicle height control.

First, the manual vehicle height control will be explained.

The manual vehicle height control is executed using the vehicle height selection switch 125.

The occupant of the vehicle can select the target vehicle height from among the high vehicle height, the low vehicle height, and the normal vehicle height by operating the vehicle height selection switch 125 when the vehicle height adjustment prohibition switch 130 is positioned at the non-operation position.

Next, the operations of the leveling valve 61, the spring constant change valve 62, the bypass valve 63, the main valve 64, and the pump device 71 when the target vehicle height is set to the high vehicle height by the vehicle height selection switch 125 under the state where the vehicle height of the vehicle is at the low vehicle height will be described with reference to FIG. 2.

Figure 2:
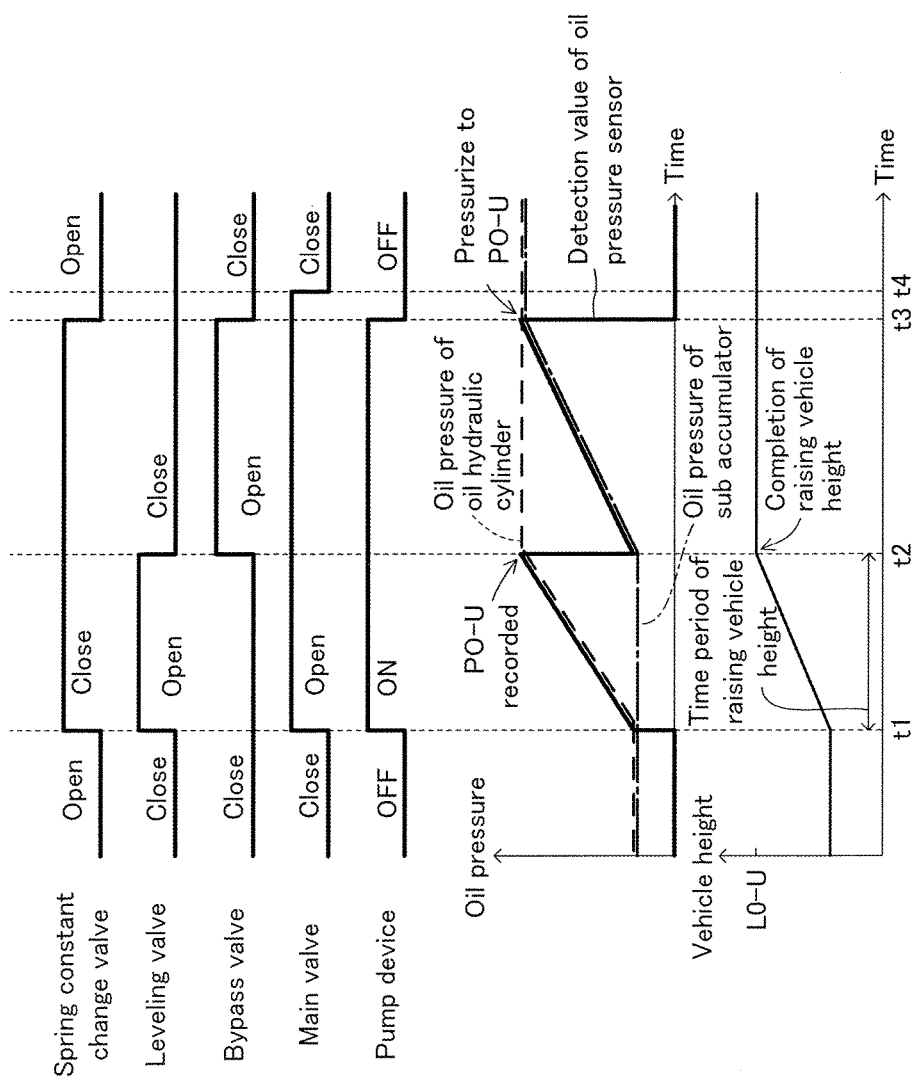
FIG. 2 is a timing chart showing operation state of each of valves and a pump device when manual vehicle height control is executed.

First of all, the ECU 100 closes each of the spring constant change valves 62 at time t1 in FIG. 2 not to flow the hydraulic oil between the corresponding oil hydraulic cylinder 20 and the corresponding sub accumulator 32.

Further, at time t1 the ECU 100 opens each leveling valve 61 and the main valve 64 and further actuates the pump device 71. Then, the hydraulic oil in the reservoir tank 72 is supplied to each of the oil hydraulic cylinders 20 and each of the main accumulators 31 via the oil hydraulic control circuit 50. Therefore, the oil pressure of each of the oil hydraulic cylinders 20 increases. Then, the protrusion amount of each piston rod 23 with respect to the corresponding cylinder 21 increases, so that the vehicle height of each vehicle height measured portion rises. At this time, since the bypass valves 63 are closed, the hydraulic oil fails to flow into each sub accumulator 32, so that the oil pressure of each sub accumulator 32 does not rise.

The ECU 100 maintains each leveling valve 61 and the main valve 64 in the opened state, maintains each bypass valve 63 in the closed state, and maintains the pump device 71 in an operation state until the vehicle height of each vehicle height measured portion, which is detected by the vehicle height sensor, becomes equal to the high vehicle height being the target vehicle height.

When the vehicle height of each vehicle height measured portion, which is detected by the vehicle height sensor at time t2, becomes equal to the high vehicle height being the target vehicle height, the ECU 100 obtains the oil pressure of the hydraulic oil, which is detected by the pressure sensor 90. The oil pressure detected by the pressure sensor 90 at this time is equal to the oil pressure of the hydraulic oil in each of the oil hydraulic cylinders 20. The oil pressure detected by the pressure sensor 90 at this time is referred to as vehicle height adjustment completion pressure PO-U. This vehicle height adjustment completion pressure PO-U is recorded in the memory of the ECU 100.

Subsequently, at time t2 the ECU 100 switches each leveling valve 61 to the closed state and switches each bypass valve 63 to the opened state. Furthermore, the ECU 100 maintains the main valve 64 in the opened state and maintains the pump device 71 in the operating state. Then, the hydraulic oil flowing from reservoir tank 72 to the common supply/discharge passage 54 flows into each sub accumulator 32 via each individual bypass passage 53, so that the oil pressure of each sub accumulator 32 increases.

Furthermore, the ECU 100 obtains the oil pressure of the hydraulic oil which is measured by the pressure sensor 90. The oil pressure detected by the pressure sensor 90 at this time is equal to the oil pressure of the hydraulic oil in each sub accumulator 32.

When the oil pressure of the hydraulic oil in each sub accumulator 32, which is detected by the pressure sensor 90 at time t3, is equal to the vehicle height adjustment completion pressure PO-U, the ECU 100 switches each bypass valve 63 from the opened state to the closed state and stops the pump device 71.

In addition, the ECU 100 switches each spring constant change valve 62 from the closed state to the opened state. Thereby, each of the oil hydraulic cylinders 20 and the corresponding sub accumulator 32 are communicated with each other. Then, as will be described later, the wheel rate of each wheel W is set to be small value.

Noted that since the oil pressure of each of the oil hydraulic cylinders 20 and the oil pressure of the corresponding sub accumulator 32 are equal to each other at time t3, when each of the spring constant change valves 62 is opened, the hydraulic oil does not flow from each of the oil hydraulic cylinders 20 to the corresponding sub accumulator 32. That is, at this time the protrusion amount of each piston rod 23 with respect to the corresponding cylinder 21 does not change (does not decrease), so that the vehicle height of each vehicle height measured portion is maintained at the high vehicle height.

Further, at time t4 the ECU 100 switches the main valve 64 to the closed state to terminate the manual vehicle height control.

It should be noted that, when the target vehicle height is lowed, the manual vehicle height control is executed by the same procedure as the case where the target vehicle height is raised.

However, in this case, the pump device 71 is maintained in the non-operation state while the manual vehicle height control is executed.

Next, the automatic vehicle height control will be explained.

The automatic vehicle height control includes an auto leveling control and a vehicle speed correspondence automatic control.

First, the auto leveling control will be explained.

The ECU 100 determines whether or not the vehicle height of each vehicle height measured portion deviates from (separates from) the target vehicle height by an amount more than or equal to a predetermined amount by using the detected value of the vehicle height sensor at regular time intervals.

The auto leveling control is the control to return the vehicle height of each vehicle height measured portion back to a height which is the substantially same as the target vehicle height when the vehicle height of each vehicle height measured portion deviates from the target vehicle height by more than or equal to the predetermined amount more than or equal to a predetermined number of times within a predetermined period of time under the state where the vehicle is stopped or running. For example, after the vehicle height is adjusted to the target vehicle height set by the vehicle height selection switch 125 by the manual vehicle height control, when the total weight of all the occupants and/or the total weight of the luggage loaded in the luggage room is larger than before the vehicle height is adjusted, the vehicle height of each vehicle height measured portion may be lowered from the target vehicle height. In such a case, the auto leveling control is executed.

Hereinafter, the auto leveling control of the present embodiment will be explained with reference to FIGS. 3 and 4.

Figure 3:
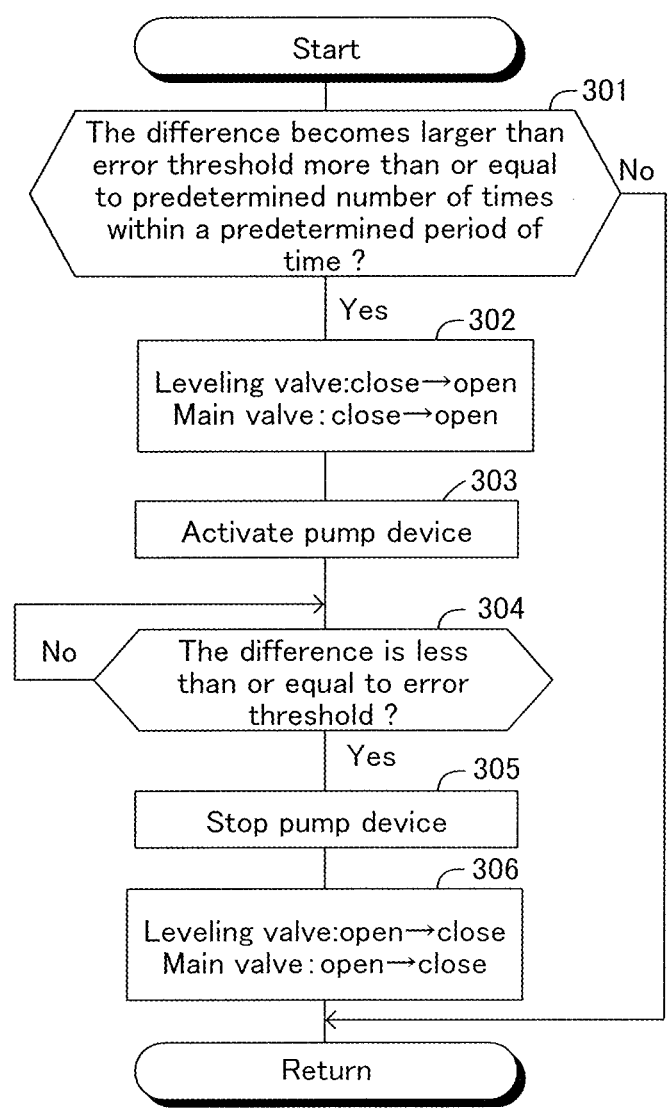
FIG. 3 is a flowchart showing a processing executed by an ECU when auto leveling control is executed.

When an ignition switch of the vehicle is switched from an OFF position to an ON position by operation of an ignition key (not shown), the ECU 100 repeatedly executes the routine shown in the flowchart of FIG. 3 every time a predetermined period of time passes.

Figure 4:
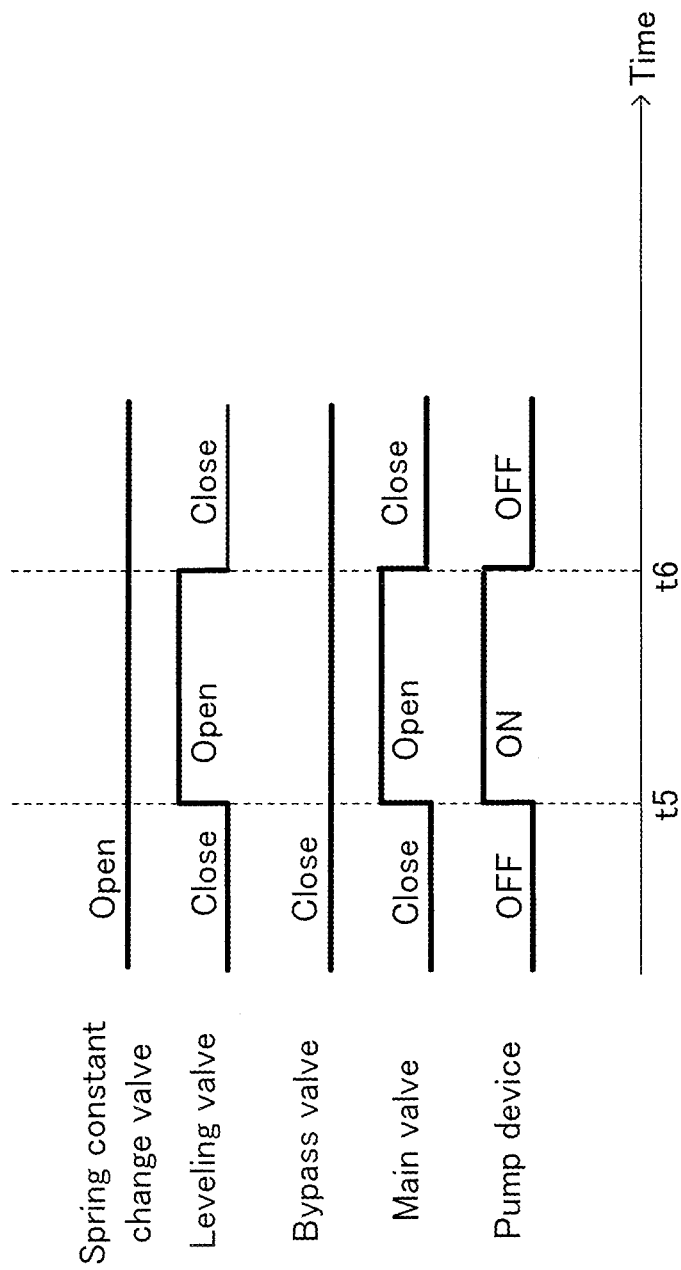
FIG. 4 is a timing chart showing the operation state of each of the valves and the pump device when the auto leveling control is executed.

As is apparent from FIG. 4, when the auto leveling control is executed, the ECU 100 maintains each spring constant change valve 62 in the opened state.

Firstly, in step 301, the ECU 100 determines whether or not the actual vehicle height of each vehicle height measured portion at the current time substantially deviates from the target vehicle height. More specifically, the ECU 100 determines whether or not the difference between the actual vehicle height and the target vehicle height becomes larger than a predetermined error threshold recorded in the memory more than or equal to the predetermined number of times within the predetermined period of time.

For example, when the ECU 100 determines Yes in step 301 at time t5 in FIG. 4, the ECU 100 proceeds to step 302. Then, for example, at time t5 the ECU 100 opens each leveling valve 61 that was in the closed state and opens the main valve 64 that was in the closed state.

The ECU 100 that has finished the processing of step 302 proceeds to step 303 to activate the pump device 71, for example, at time t5.

Then, the hydraulic oil flowing from the reservoir tank 72 to the common supply/discharge passage 54 flows to each oil hydraulic cylinder 20 via each individual bypass passage 53 and each individual supply/discharge passage 51. Therefore, the oil pressure of each oil hydraulic cylinder 20 increases and the vehicle height of each vehicle height measured portion rises.

The ECU 100 that has finished the processing of step 303 proceeds to step 304 to determine whether or not the difference between the vehicle height and the target vehicle height is less than or equal to the error threshold.

For example, at time t6 in FIG. 4, when the ECU 100 determines Yes in step 304, the ECU 100 proceeds to step 305. Then, the ECU 100 stops the pump device 71, for example, at time t6.

The ECU 100 that has finished the processing of step 305 proceeds to step 306 to close each leveling valve 61 that was in the opened state and close the main valve 64 that was in the opened state, for example, at time t6.

As a result, the vehicle height of the vehicle is maintained at the vehicle height when the ECU 100 determined Yes in step 304.

When finishing the processing of step 306, the ECU 100 temporarily ends the processing of this routine.

Further, when determining No in step 301, the ECU 100 temporarily ends the processing of this routine.

Next, the vehicle speed correspondence automatic control will be explained.

For example, when the vehicle speed of the vehicle becomes higher than a predetermined first speed threshold under the state where the target vehicle height is selected as the low vehicle height or the high vehicle height by the occupant, the ECU 100 changes the target vehicle height to the normal vehicle height. The ECU 100 changes the target vehicle height to a preset low vehicle height for high-speed when, for example, the vehicle speed of the vehicle becomes higher than a predetermined second speed threshold. Further, when a transfer setting detected by a transfer sensor is set as L4 range (off-road driving range), the ECU 100 changes the target vehicle height to the high vehicle height when the vehicle speed of the vehicle becomes higher than or equal to a predetermined third speed threshold. Each of these controls is the vehicle speed correspondence automatic control.

It should be noted that the ECU 100 executes this vehicle speed correspondence automatic control while switching the operating states of each leveling valve 61, each spring constant change valve 62, each bypass valve 63, the main valve 64 and the pump device 71 in the same manner as the auto leveling control. That is, the ECU 100 controls each leveling valve 61, each spring constant change valve 62, each bypass valve 63, the main valve 64 and the pump device 71 in accordance with the processing of steps 302 to 305 of the flowchart in FIG. 3 to execute the vehicle speed correspondence automatic control.

Next, the wheel rate switching control will be explained.

In the present embodiment, when the wheel rate is switched, the communication between the sub accumulator 32 and the corresponding oil hydraulic cylinder 20 is permitted or prohibited. That is, the communication between the sub accumulator 32 and the oil hydraulic cylinder 20 is permitted or prohibited in accordance with opening/closing control of each spring constant change valve 62 by the ECU 100.

When the sub accumulator 32 and the oil hydraulic cylinder 20 communicate with each other, the main accumulator 31 and the sub accumulator 32 are connected to each other in a serial connection state. Therefore, if the main accumulator 31 and the sub accumulator 32 are considered to be single gas spring (that is, if the main accumulator 31 and the sub accumulator 32 are treated as single gas spring), the spring constant of this single gas spring is smaller than that of the main accumulator 31 alone.

In other words, when the communication between the sub accumulator 32 and the oil hydraulic cylinder 20 is blocked by closing the corresponding spring constant change valve 62, the wheel rate of the wheel W corresponding to this oil hydraulic cylinder 20 becomes large value. On the other hand, when the sub accumulator 32 and the oil hydraulic cylinder 20 are communicated with each other by opening the corresponding spring constant change valve 62, the wheel rate of the wheel W corresponding to this oil hydraulic cylinder 20 becomes small value.

For example, the ECU 100, as a general rule, closes all the spring constant change valves 62 when the vehicle is in a predetermined traveling state described later. However, when a valve switching condition at high pressure described later is satisfied, the ECU 100 does not close all the spring constant change valves 62 even though the vehicle is in the predetermined traveling state. When all the spring constant change valves 62 are closed, the flow of the hydraulic oil between each oil hydraulic cylinder 20 and each sub accumulator 32 is blocked and thus the wheel rate of each wheel W becomes larger.

In the present embodiment, when the vehicle turns, the vehicle suddenly starts, or sudden braking is executed during high-speed driving, the ECU 100 determines that "the vehicle is in the predetermined traveling state" based on the detection result of the motion detection sensor 110.

For example, when the vehicle turns, the vehicle performs roll motion. However, the roll motion amount of the vehicle body can be reduced by increasing the wheel rate of each wheel W.

On the other hand, for example, when the vehicle is not in the predetermined traveling state, the ECU 100 makes each oil hydraulic cylinder 20 and each sub accumulator 32 communicated with each other by opening all the spring constant change valves 62. Then, the wheel rate of each wheel W becomes smaller, so that ride quality of the vehicle improves.

However, in the present embodiment, when the vehicle height is changing due to the automatic vehicle height control, the ECU 100 cannot execute the wheel rate switching control. On the other hand, when the predetermined condition set for each automatic vehicle height control is satisfied under the state where the wheel rate is being changed by the wheel rate switching control, the ECU 100 stops the wheel rate switching control and executes the automatic vehicle height control.

Furthermore, when at least one of the luggage door and the side doors is in the opened state, the total weight of all the occupants and/or the total weight of the luggage loaded in the luggage room may change before these doors are closed. Therefore, when at least one of the door is in the opened state, the ECU 100 does not execute the wheel rate switching control.

It should be noted that the ECU 100 may simultaneously control each of the suspension devices 10FL, 10FR, 10RL, 10RR during the vehicle height control and/or the wheel rate switching control. The ECU 100 may sequentially control each of the suspension devices 10FL, 10FR, 10RL, 10RR one by one during the vehicle height control and/or the wheel rate switching control.

By the way, when the total weight of the luggage loaded in the luggage room provided at the rear portion of the vehicle is large value, the oil pressure of each of the rear wheel side oil hydraulic cylinders 20RL, 20RR is large value. Then, the oil pressure of the rear wheel side oil hydraulic cylinders 20RL, 20RR may become larger than or equal to a predetermined oil pressure threshold Thop recorded in the memory of the ECU 100.

When the front wheel rate and the rear wheel rate are made to be large values by closing all the spring constant change valves 62 under the state where the oil pressure of each of the rear wheel side oil hydraulic cylinders 20RL, 20RR is greater than or equal to the oil pressure threshold Thop, the rear wheel rate becomes excessively large. Therefore, the rear wheel rate may become larger than the front wheel rate. Therefore, the rear roll stiffness may become larger than the front roll stiffness. As a result, there is a risk that the steer characteristic of the vehicle has tendency to oversteer when, for example, the vehicle turns.

Furthermore, when the rear wheel rate is larger than the front wheel rate, the behavior of the vehicle may become unstable when the vehicle starts suddenly and sudden braking is executed during high-speed driving.

Therefore, in the present embodiment, the mode of the wheel rate switching control when the vehicle is in the predetermined traveling state is changed depending on whether or not the oil pressure of each of the rear wheel side oil hydraulic cylinders 20RL, 20RR is more than or equal to the oil pressure threshold Thop.

Hereinafter, the wheel rate switching control of the present embodiment will be explained in detail with reference to FIGS. 5 to 7.

Figure 5:
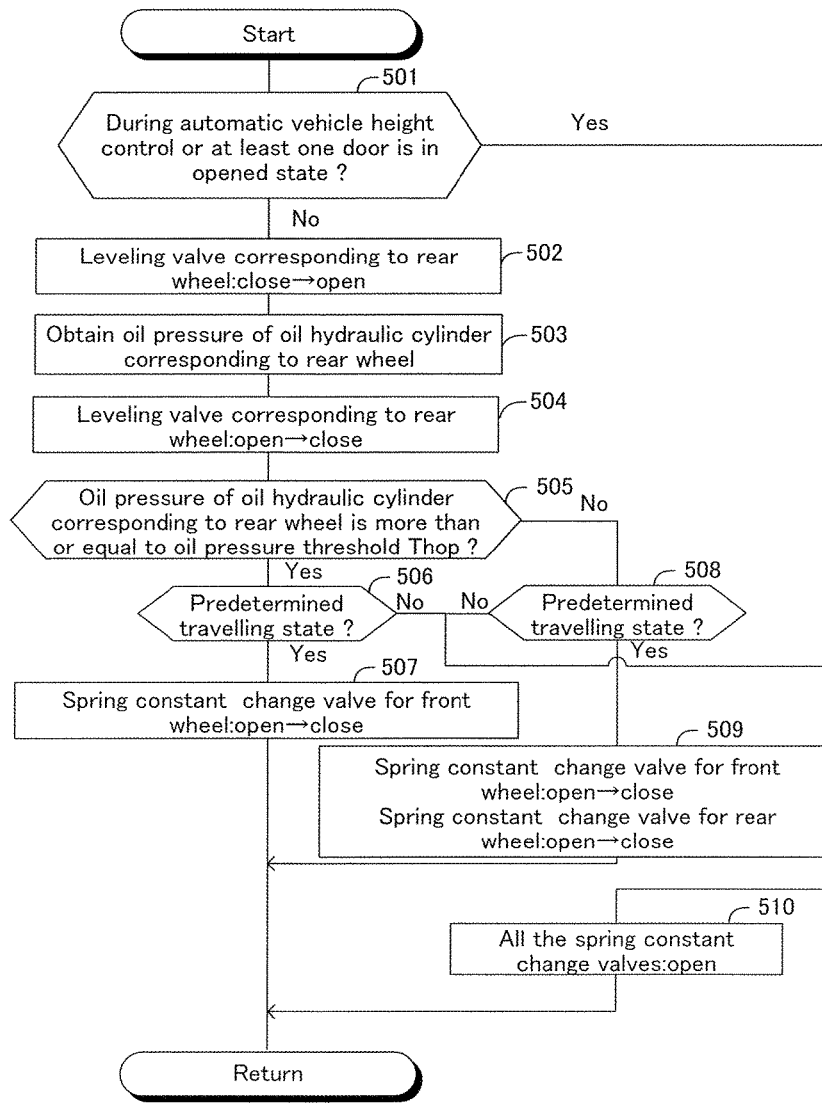
FIG. 5 is a flowchart showing a processing executed by the ECU when wheel rate switching control is executed.

When the ignition switch of the vehicle is switched from the OFF position to the ON position by the operation of the ignition key, the ECU 100 repeatedly executes the routine shown in the flowchart of FIG. 5 every time a predetermined period of time passes.

Figure 6:
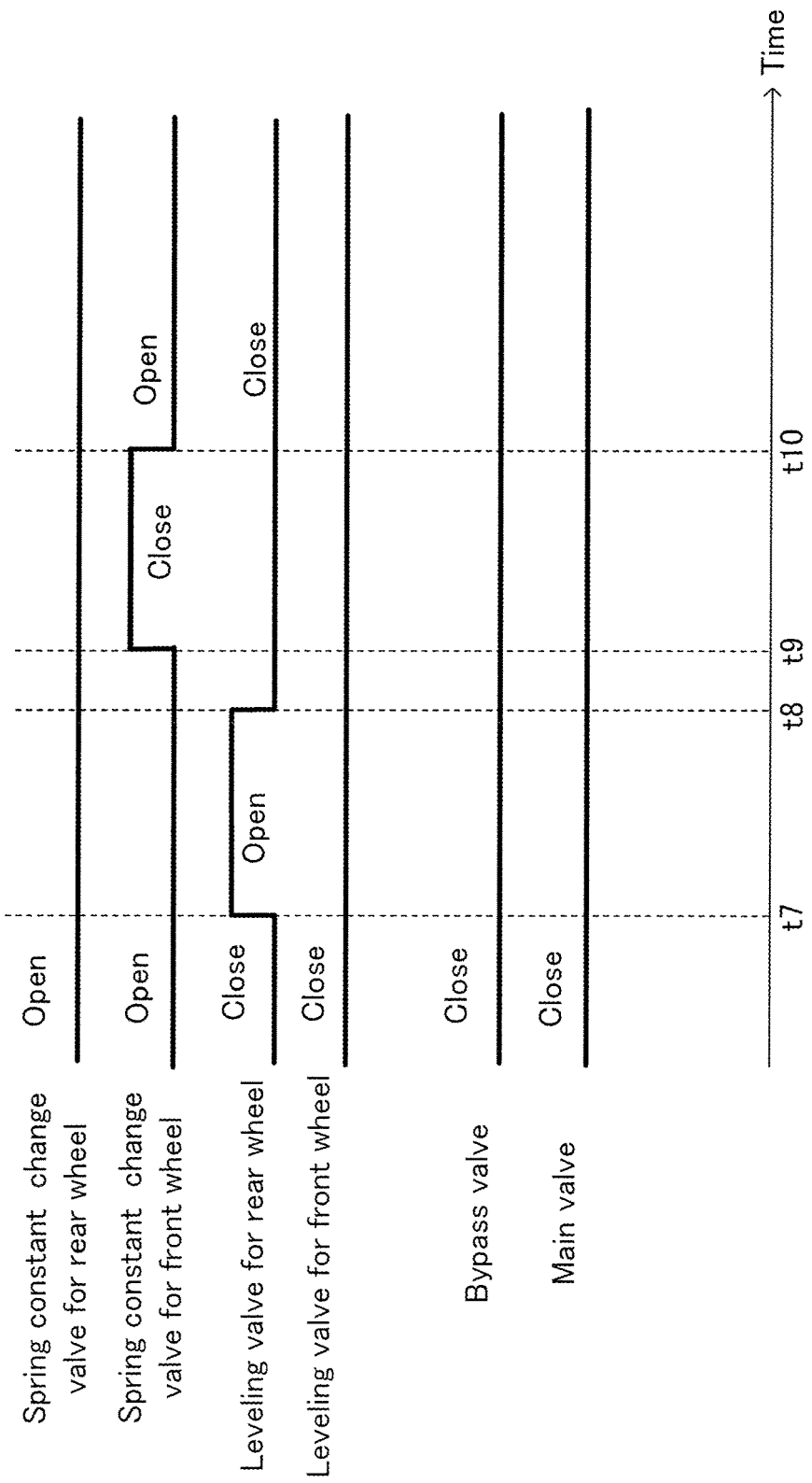
FIG. 6 is a timing chart showing the operation state of each of the valves and an oil pressure sensor when valve switching condition at high pressure is satisfied.
Figure 7:
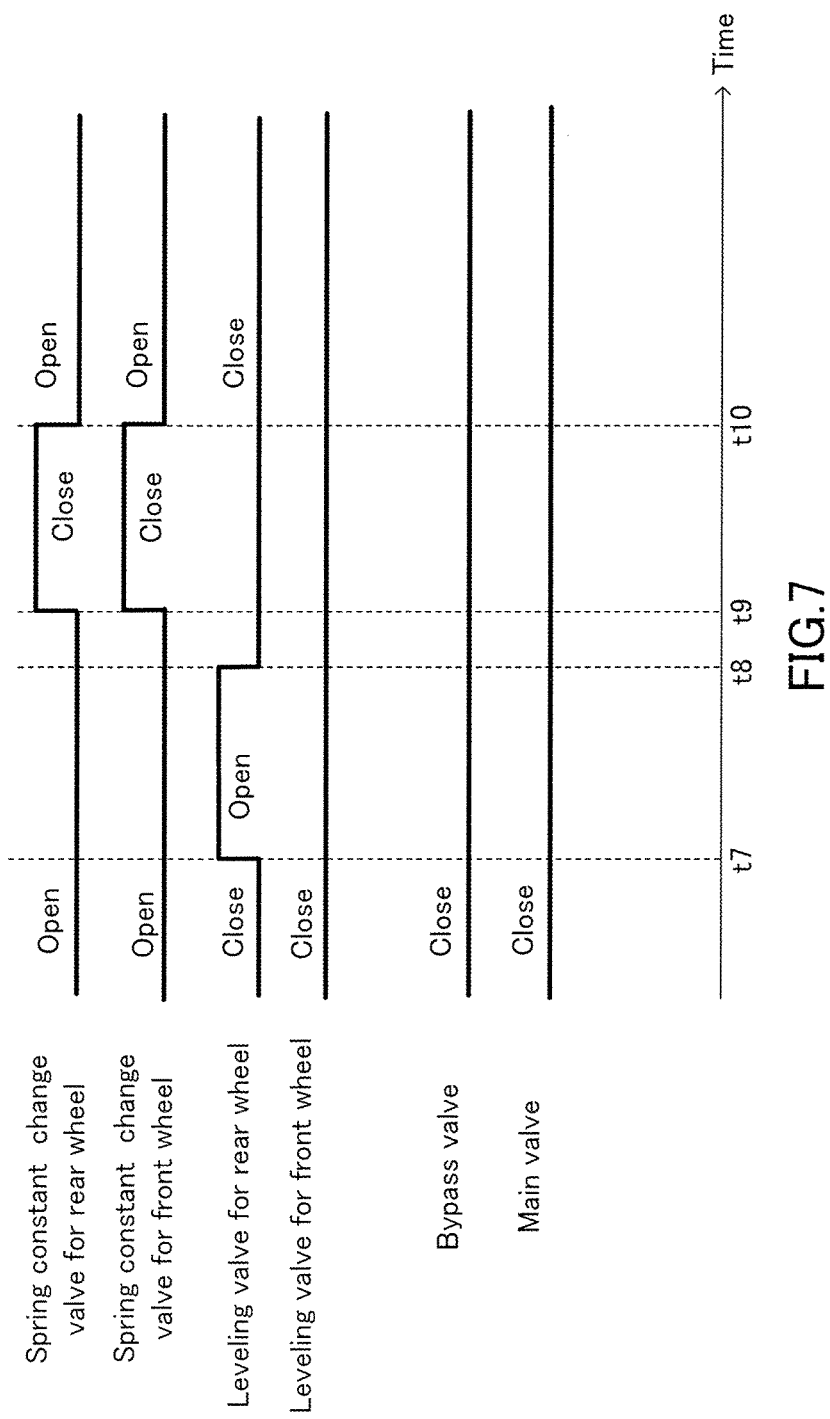
FIG. 7 is a timing chart showing the operation state of each of the valves and the oil pressure sensor when the vehicle switching condition at high pressure is not satisfied and the vehicle turns.

As is apparent from FIGS. 6 and 7, when executing the wheel rate switching control, the ECU 100 maintains the bypass valves 63 in the closed state.

First of all, in step 501 the ECU 100 determines whether or not the automatic vehicle height control is being executed at the current time.

In addition, in step 501 the ECU 100 determines whether or not at least one of the luggage door and the side doors is in the opened state at the current time based on the information from the door open state detection means 105.

When determining Yes in step 501, the ECU 100 proceeds to step 510 to set all the spring constant change valves 62 to the opened state. It should be noted that, when all the spring constant change valves 62 are in the opened state at the processing time of step 501, the ECU 100 maintains all the spring constant change valves 62 in the opened state in step 510.

When finishing the processing of step 510, the ECU 100 temporarily ends the processing of this routine.

When determining No in step 501, the ECU 100 proceeds to step 502 to switch each of the leveling valves 61RL, 61RR corresponding to each of the rear wheels WRL, WRR from the closed state to the opened state, for example, at time t7 as shown in FIGS. 6 and 7.

The ECU 100 that has finished the processing of step 502 proceeds to step 503 to obtain the oil pressure of the rear wheel side oil hydraulic cylinders 20RL, 20RR, which is measured by the pressure sensor 90, from the pressure sensor 90, for example, at time t7.

In step 503, the ECU 100 records the oil pressure of the rear wheel side oil hydraulic cylinders 20RL, 20 RR, which is detected by the pressure sensor 90, in the memory.

The ECU 100 that has finished the processing of step 503 proceeds to step 504 to switch the leveling valves 61RL, 61RR from the opened state to the closed state, for example, at time t8 as shown in FIGS. 6 and 7.

The ECU 100 that has finished the processing of step 504 proceeds to step 505 to determine whether or not the oil pressure of the rear wheel side oil hydraulic cylinders 20RL, 20RR is more than or equal to the oil pressure threshold Thop recorded in the memory.

When determining Yes in step 505, the ECU 100 proceeds to step 506. In other words, when, for example, a heavy luggage is loaded in the luggage room, the ECU 100 proceeds to step 506.

In step 506 the ECU 100 determines whether or not the vehicle is in the predetermined traveling state. This determination is made based on the detection result of the motion detection sensor 110.

The ECU 100 that has determined Yes in step 506 proceeds to step 507. As shown in FIG. 6, the ECU 100 closes each of the spring constant change valves 62FL, 62FR corresponding to each of front wheels WFL, WFR, for example, at time t9.

At this time, the ECU 100 keeps the opened state of each of the spring constant change valves 62RL, 62RR corresponding to each of the rear wheels WRL, WRR.

It should be noted that, when the ECU 100 determines Yes in steps 505 and 506, the predetermined valve switching condition at high pressure is satisfied. The control executed by the ECU 100 in step 507 is referred to as a specific valve control.

When the ECU 100 executes the specific valve control due to satisfaction of the valve switching condition at high pressure, the front wheel rate is set to be large value, while the rear wheel rate is set (kept) to be small value. Therefore, the rear roll stiffness does not become larger than the front roll stiffness.

Thus, when, for example, the vehicle turns, the steer characteristic of the vehicle is less likely to have tendency to oversteer.

When finishing the processing of step 507, the ECU 100 temporarily ends the processing of this routine.

Then, as shown in FIG. 6, when determining No in step 506 of the processing of this routine after the current processing (i.e., from the next time), for example, at time t10, the ECU 100 proceeds to step 510. When, for example at time t10, the vehicle is traveling straight, the ECU 100 proceeds to step 510.

Then, the ECU 100 opens each of the spring constant change valves 62FL, 62FR corresponding to each of the front wheels WFL, WFR. Further, the ECU 100 keeps the opened state of each of the spring constant change valves 62RL, 62 RR corresponding to each of the rear wheels WRL, WRR. Therefore, when, for example, the vehicle travels straight, the ride quality of the vehicle improves.

When finishing the processing of step 510, the ECU 100 temporarily ends the processing of this routine.

On the other hand, when the ECU 100 determines No in step 505, the ECU 100 proceeds to step 508. In other words, when, for example, a heavy luggage is not loaded in the luggage room, the ECU 100 proceeds to step 508.

The ECU 100 determines whether or not the vehicle is in the predetermined traveling state in step 508.

The ECU 100 that has determined Yes in step 508 proceeds to step 509. As shown in FIG. 7, the ECU 100 closes the spring constant change valves 62FL, 62 FR and closes the spring constant change valves 62RL, 62RR, for example, at time t9. Then, the roll motion amount of the vehicle, which is in the predetermined traveling state, becomes small.

At this time, the oil pressure of each of the rear wheel side oil hydraulic cylinders 20RL, 20RR is smaller than the oil pressure threshold Thop, so that, for example, the steer characteristic of the vehicle does not have tendency to oversteer when the vehicle turns.

When finishing the processing of step 509, the ECU 100 temporarily ends the processing of this routine.

Then, when determining No in step 508 of the processing of this routine after the current processing (i.e., from the next time), for example, at time t10 of FIG. 7, the ECU 100 proceeds to step 510. When, for example at time t10, the vehicle is traveling straight, the ECU 100 proceeds to step 510.

Then, the ECU 100 opens the spring constant change valves 62FL, 62FR and opens the spring constant change valves 62RL, 62RR.

When finishing the processing of step 510, the ECU 100 temporarily ends the processing of this routine.

Although the suspension system 1 according to the present embodiment has been described above, the present invention is not limited to the above embodiment, and various modified embodiments are possible without departing from the object of the present invention.

Figure 8:
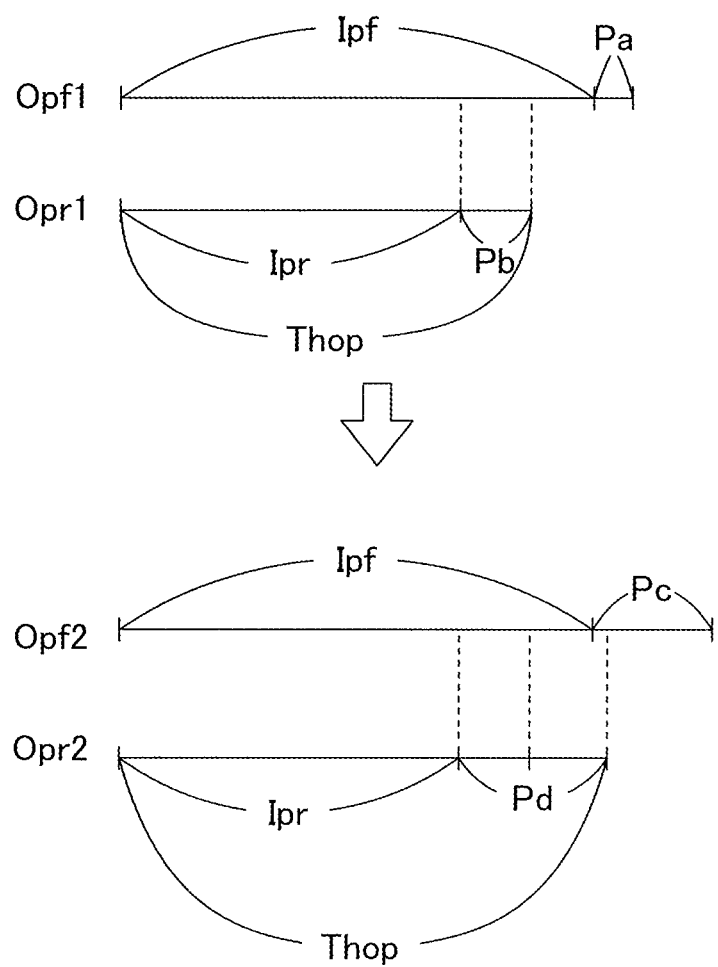
FIG. 8 is a view for explaining the magnitude of the oil pressure threshold according to a first modified embodiment of the present invention.

For example, the present invention may be executed in a manner of a first modified embodiment shown in FIG. 8.

The front roll stiffness distribution and the rear roll stiffness distribution (i.e., the roll stiffness distribution on the rear wheels WRL, WRR side) actually have a certain correlation with a ratio between the oil pressure of the front wheel side oil hydraulic cylinders 20FL, 20FR and the oil pressure of the rear wheel side oil hydraulic cylinders 20RL, 20RR. That is, a rear wheel side oil pressure ratio, which is the value obtained by dividing the oil pressure of the oil pressure of the rear wheel side oil hydraulic cylinders 20RL, 20RR by the oil pressure of the front wheel side oil hydraulic cylinders 20FL, 20FR, is more than or equal to a predetermined ratio threshold, the rear roll stiffness distribution may become excessively large value.

The oil pressure threshold Thop of this modified embodiment is set as the oil pressure of the rear wheel side oil hydraulic cylinders 20RL, 20RR when the rear wheel side oil pressure ratio is equal to the ratio threshold. That is, the oil pressure threshold Thop in the present modified embodiment is a variable value which varies depending on the oil pressure of the front wheel side oil hydraulic cylinders 20FL, 20FR and the oil pressure of the rear wheel side oil hydraulic cylinders 20RL, 20RR.

Thus, the oil pressure threshold Thop is the value determined based on the relationship between the front and rear roll stiffnesses and the oil pressures of the front wheel side oil hydraulic cylinders 20FL, 20FR and the rear wheel side oil hydraulic cylinders 20RL, 20RR. Therefore, when the ECU 100 executes the wheel rate switching control using this oil pressure threshold Thop, the risk that the behavior of the vehicle becomes unstable when the vehicle is in the predetermined traveling state becomes smaller.

By the way, FIG. 8 shows the oil pressure of the front wheel side oil hydraulic cylinders 20FL, 20FR and the oil pressure of the rear wheel side oil hydraulic cylinders 20RL, 20RR when a kind of load is applied to the vehicle, and the oil pressure of the front wheel side oil hydraulic cylinders 20FL, 20FR and the oil pressure of the rear wheel side oil hydraulic cylinders 20RL, 20RR when another kind of load is applied to the vehicle.

That is, when a heavy luggage is loaded in the luggage room and only the driver is located inside the vehicle, the oil pressure Opf1 of the front wheel side oil hydraulic cylinders 20FL, 20FR is Ipf+Pa, and the oil pressure Opr1 of the rear wheel side oil hydraulic cylinders 20RL, 20RR is Ipr+Pb. Pa is part of the oil pressure of the front wheel side oil hydraulic cylinders 20FL, 20FR, and Pa is generated (increased) due to the total weight of the luggage and the driver. On the other hand, Pb is part of the oil pressure of the rear wheel side oil hydraulic cylinders 20RL, 20RR, and Pb is generated (increased) due to the total weight of the luggage and the driver. Ipf is the oil pressure of the front wheel side oil hydraulic cylinders 20FL, 20FR when no load other than the vehicle is applied to the vehicle by moving the luggage and the driver out of the vehicle. Ipr is the oil pressure of the rear wheel side oil hydraulic cylinders 20RL, 20RR when no load other than the vehicle is applied to the vehicle. Further, in the example shown in FIG. 8, Ipr+Pb=the oil pressure threshold Thop. In other words, when the total weight of the luggage and the driver changes, the value of Ipr+Pd may be a value which is not be coincident with the oil pressure threshold Thop.

On the other hand, when a heavy luggage is loaded in the luggage room provided at the rear portion of the vehicle and multiple (enormous) occupants are located in the vehicle, the oil pressure Opf2 of the front wheel side oil hydraulic cylinders 20FL, 20FR is Ipf+Pc, and the oil pressure Opr2 of the rear wheel side oil hydraulic cylinders 20RL, 20RR is Ipr+Pd. Pc is part of the oil pressure of the front wheel side oil hydraulic cylinders 20FL, 20FR, and Pc is generated (increased) due to the total weight of the luggage and all the occupants. Pd is part of the oil pressure of the rear wheel side oil hydraulic cylinders 20RL, 20RR, and Pd is generated (increased) due to the total weight of the luggage and all the occupants. Further, in the example of FIG. 8, Ipr+Pd=the oil pressure threshold Thop. In other words, when the total weight of the luggage and all the occupants changes, the value of Ipr+Pd may be a value which is not be coincident with the oil pressure threshold Thop.

As apparent from FIG. 8, when a heavy luggage is loaded in the luggage room provided at the rear portion of the vehicle and multiple (enormous) occupants are located in the vehicle, the oil pressure of the front wheel side oil hydraulic cylinders 20FL, 20FR becomes larger than when only the driver is located inside the vehicle. Therefore, the oil pressure threshold Thop in this case becomes a value larger than when only the driver is located inside the vehicle.

Therefore, when, for example, a heavy luggage is loaded in the luggage room provided at the rear portion of the vehicle and multiple (enormous) occupants are located in the vehicle, the oil pressure of the rear wheel side oil hydraulic cylinders 20RL, 20RR is harder to become larger than the oil pressure threshold Thop compared with the case where a heavy luggage is loaded in the luggage room and only the driver is located inside the vehicle. In other words, only when the total weight of the luggage and all the occupants is excessively large, the oil pressure of the rear wheel side oil hydraulic cylinders 20RL, 20RR becomes larger than the oil pressure threshold Thop. That is, the valve switching condition at high pressure is hard to be satisfied.

Also in the first modified embodiment, when the automatic vehicle height control is executed, the ECU 100 cannot execute the wheel rate switching control. In other words, in the case where the automatic vehicle height control is executed, even when the valve switching condition at high pressure is satisfied, the specific valve control is not executed.

However, in the first modified embodiment, the valve switching condition at high pressure is hard to be satisfied. That is, when the automatic vehicle height control is executed, a state where the specific valve control should be executed is hard to be realized.

Therefore, even though the specific valve control is not executed during the automatic vehicle height control, when, for example, the automatic vehicle height control is executed in a turning vehicle, the risk that the steer characteristic of the vehicle has tendency to oversteer can be reduced.

Figure 9:
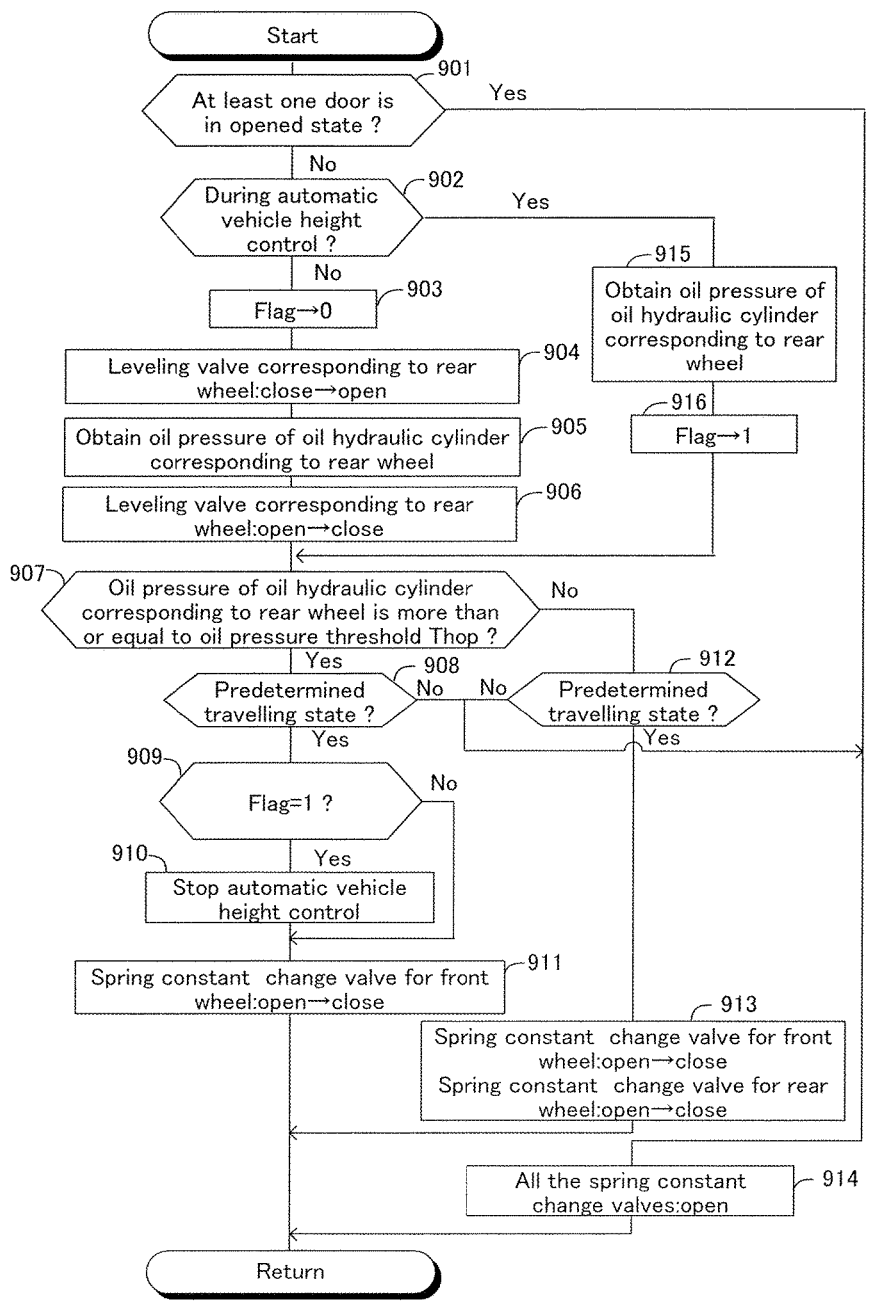
FIG. 9 is a flowchart similar to FIG. 5 according to a second modified embodiment of the present invention.

The present invention may be executed in the manner of a second modified embodiment shown in FIG. 9.

In the second modified embodiment, the suspension system 1 is configured so that the ECU 100 can execute the wheel rate switching control during the execution of the automatic vehicle height control.

That is, when the valve switching condition at high pressure is satisfied under the state where the automatic vehicle height control is executed, the ECU 100 executes the specific valve control and stops the automatic vehicle height control.

The flowchart of FIG. 9 is the same as the flowchart of FIG. 5 except steps 901, 902, 903, 909, 910, 915, and 916.

First of all, in step 901 the ECU 100 determines whether or not at least one of the luggage door and the side doors is in the opened state at the current time.

When determining Yes in step 901, the ECU 100 proceeds to step 914.

Further, the ECU 100 that has finished the processing of step 914 temporarily ends the processing of this routine.

On the other hand, when determining No in step 901, the ECU 100 proceeds to step 902 to determine whether or not the automatic vehicle height control is being executed at the current time.

When determining No in step 902, the ECU 100 proceeds to step 903 to set a flag to "0". The initial value of the flag is "0".

The ECU 100 that has finished the processing of step 903 proceeds to step 907 via steps 904 to 906. The processing of each of steps 904 to 906 is the same as steps 502 to 504 of the flowchart of FIG. 5, respectively.

Further, when determining Yes in step 907 and Yes in step 908, the ECU 110 proceeds to step 909.

Then, the ECU 100 determines No in step 909 and proceeds to step 911 to execute the specific valve control.

On the other hand, when determining Yes in step 902, the ECU 100 proceeds to step 915 to obtain the oil pressure of the rear wheel side oil hydraulic cylinders 20RL, 20RR, which is measured by the pressure sensor 90.

Since the automatic vehicle height control is being executed, at this time, both of the leveling valves 61RL, 61RR, which correspond to each of the rear wheels WRL, WRR respectively, are opened.

Furthermore, in step 915 the ECU 100 records the oil pressure of the rear wheel side oil hydraulic cylinders 20RL, 20RR, which is detected by the pressure sensor 90, in the memory.

When finishing the processing of step 915, the ECU 100 proceeds to step 916 to set the flag to "1".

The ECU 100 that has finished the processing of step 916 proceeds to step 907.

Further, when determining Yes in step 907 and Yes in step 908, the ECU 110 proceeds to step 909.

Then, the ECU 100 determines Yes in step 909 and proceeds to step 910. That is, the ECU 100 stops the automatic vehicle height control.

The ECU 100 that has finished the processing of step 910 proceeds to step 911 to execute the specific valve control.

The ECU 100 that has finished the processing of steps 911, 913 or 914 temporarily ends the processing of this routine.

As described above, in the second modified embodiment, when the valve switching condition at high pressure is satisfied during the execution of the automatic vehicle height control, the automatic vehicle height control is prohibited and the specific valve control is executed.

Thus, when, for example, the automatic vehicle height control is executed while the vehicle is turning, the risk that the steer characteristic of the vehicle has tendency to oversteer can be reduced.

In the above embodiment and each modified embodiment, the number of the gas springs provided in each oil hydraulic cylinder 20 is two (i.e., the main accumulator 31 and the sub accumulator 32). However, more than two gas springs may be provided in each oil hydraulic cylinder 20. For example, a relief gas spring for releasing pressure when the pressure of the oil hydraulic control circuit 50 abnormally rises may be provided so as to always communicate with the oil hydraulic cylinder 20.

Each of the individual bypass passages 53 and each of the bypass valves 63 may be omitted from the suspension system 1. In this case, the hydraulic oil discharged from the hydraulic oil supply/discharge device 70 is supplied to each sub accumulator 32 by opening the leveling valves 61 and the spring constant change valves 62 simultaneously.

What is claimed is:

1. A suspension system comprising:
two front wheel side oil hydraulic cylinders provided between left and right front wheels of a vehicle and a vehicle body respectively, said each front wheel side oil hydraulic cylinder extending and contracting according to vertical distance change between said each front wheel and said vehicle body, said each front wheel side oil hydraulic cylinder moving said vehicle body upwards with respect to said front wheels as oil pressure of hydraulic oil filled in said each front wheel side oil hydraulic cylinder increases;

two rear wheel side oil hydraulic cylinders provided between left and right rear wheels and said vehicle body respectively, said each rear wheel side oil hydraulic cylinder extending and contracting according to vertical distance change between said each rear wheel and said vehicle body, said each rear wheel side oil hydraulic cylinder moving said vehicle body upwards with respect to said rear wheels as oil pressure of hydraulic oil filled in said each rear wheel side oil hydraulic cylinder increases;

hydraulic oil supply means capable of supplying said hydraulic oil to said front wheel side oil hydraulic cylinders and said rear wheel side oil hydraulic cylinders while adjusting said oil pressure;

four first gas springs each of which is provided so as to correspond to said each front wheel side oil hydraulic cylinder and said each rear wheel side oil hydraulic cylinder respectively and has a first oil chamber and a first gas chamber, wherein each said first oil chamber communicates with said each front wheel side oil hydraulic cylinder or said each rear wheel side oil hydraulic cylinder and is filled with said hydraulic oil, said first gas chamber filled with a gas having elasticity;

four second gas springs each of which is provided so as to correspond to said each front wheel side oil hydraulic cylinder and said each rear wheel side oil hydraulic cylinder respectively and has a second oil chamber and a second gas chamber, each second gas spring being independent form said first gas springs, wherein each said second oil chamber can communicate with said each front wheel side oil hydraulic cylinder or said each rear wheel side oil hydraulic cylinder and is filled with said hydraulic oil, said second gas chamber filled with a gas having elasticity;

two spring constant change valves for front wheel each of which is provided so as to correspond to said each front wheel side oil hydraulic cylinder, said each spring constant change valve for front wheel capable of being switched between a communication permission state and a blocking state, wherein said communication permission state is a state where said each spring constant change valve for front wheel permits communication of said hydraulic oil between said front wheel side oil hydraulic cylinder and said corresponding second oil chamber so that said second gas spring and said first gas spring, both of which correspond to the same front wheel side oil hydraulic cylinder, are connected with each other in a serial connection state, wherein said blocking state is a state where said communication is blocked;

two spring constant change valves for rear wheel each of which is provided so as to correspond to said each rear wheel side oil hydraulic cylinder, said each spring constant change valve for rear wheel capable of being switched between a communication permission state and a blocking state, wherein said communication permission state is a state where said each spring constant change valve for rear wheel permits communication of said hydraulic oil between said rear wheel side oil hydraulic cylinder and said corresponding second oil chamber so that said second gas spring and said first gas spring, both of which correspond to the same rear wheel side oil hydraulic cylinder, are connected with each other in a serial connection state, wherein said blocking state is a state where said communication is blocked;

rear wheel side oil pressure detection means for detecting said oil pressure of said hydraulic oil of said rear wheel side oil hydraulic cylinders;

traveling state determination means for determining whether or not said vehicle is in a predetermined traveling state; and a valve control device switching said spring constant change valves for front wheel between said communication permission state and said blocking state and switching said spring constant change valves for rear wheel between said communication permission state and said blocking state, wherein, said valve control device is configured to:

switch said spring constant change valves for front wheel and said spring constant change valves for rear wheel to said blocking state when said oil pressure of said hydraulic oil of said rear wheel side oil hydraulic cylinders, which is detected by said rear wheel side oil pressure detection means, is less than a predetermined oil pressure threshold and said traveling state determination means determines that said vehicle is in said predetermined traveling state; and execute a specific valve control when a valve switching condition at high pressure is satisfied, wherein said specific valve control switches said spring constant change valves for front wheel to said blocking state and switches said spring constant change valves for rear wheel to said communication permission state, wherein said valve switching condition at high pressure is satisfied when said oil pressure of said hydraulic oil of said rear wheel side oil hydraulic cylinders, which is detected by said rear wheel side oil pressure detection means, is more than or equal to said predetermined oil pressure threshold and said traveling state determination means determines that said vehicle is in said predetermined traveling state.

2. The suspension system according to claim 1, further comprising front wheel side oil pressure detection means for detecting said oil pressure of said hydraulic oil of said front wheel side oil hydraulic cylinders, wherein, said valve control device is configured to be prohibited from executing said specific valve control when said valve switching condition at high pressure is satisfied under a state where said hydraulic oil supply means supplies said hydraulic oil to said front wheel side oil hydraulic cylinders and said rear wheel side oil hydraulic cylinders so that said vehicle body moves upward with respect to said front wheels and said rear wheels, said oil pressure of said hydraulic oil of said rear wheel side oil hydraulic cylinders when a rear wheel side oil pressure ratio is equal to a predetermined ratio threshold is equal to said oil pressure threshold, said rear wheel side oil pressure ratio is a value obtained by dividing said oil pressure of said hydraulic oil of said rear wheel side oil hydraulic cylinders, which is detected by said rear wheel side oil pressure detection means, by said oil pressure of said hydraulic oil of said front wheel side oil hydraulic cylinders, which is detected by said front wheel side oil pressure detection means.

3. The suspension system according to claim 1, wherein, said valve control device executes said specific valve control and said hydraulic oil supply means is prohibited from supplying said hydraulic oil to said front wheel side oil hydraulic cylinders and said rear wheel side oil hydraulic cylinders when said valve switching condition at high pressure is satisfied under a state where said hydraulic oil supply means supplies said hydraulic oil to said front wheel side oil hydraulic cylinders and said rear wheel side oil hydraulic cylinders so that said vehicle body moves upward with respect to said front wheels and said rear wheels.

\* \* \* \* \*